V. E. MERTZ.
NOZZLE.
APPLICATION FILED JULY 7, 1915.
1,280,062.
Patented Sept. 24, 1918.
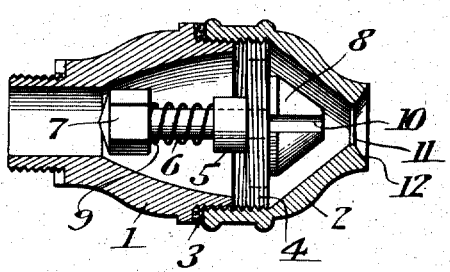
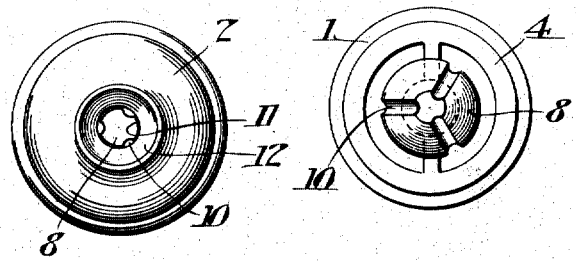
Inventor
Victor E. Mertz,
By Victor J. Evans
Attorney
Witnesses
H. E. Laughlin

UNITED STATES PATENT OFFICE.

VICTOR E. MERTZ, OF NEW YORK, N. Y.

NOZZLE.

1,280,062. Specification of Letters Patent. Patented Sept. 24, 1918.

Application filed July 7, 1915. Serial No. 38,468.

*To all whom it may concern:*

Be it known that I, VICTOR E. MERTZ, a citizen of Switzerland, residing at New York, in the county of New York and State of New York, have invented new and useful Improvements in Nozzles, of which the following is a specification.

This invention relates to nozzles and it consists in the novel features hereinafter described and claimed.

An object of the invention is to provide a nozzle having a valve member movably mounted therein in a manner to keep the nozzle free from the accumulation of solid matter, or foreign substances, in order that the device may properly function as a nozzle when in use.

With this object in view the nozzle includes a body portion in which a head is movably mounted, the said head being provided with a series of grooves adapted to register with the outlet end of the nozzle, whereby the liquid which is passed through the nozzle is divided into fine streams at the discharge end substantially in the form of sprays.

In the accompanying drawing:—

Figure 1 is a longitudinal sectional view of one form of the nozzle.

Fig. 2 is an end view of the same.

Fig. 3 is an end elevation of the same, with parts removed.

Referring more particularly to the drawing, the nozzle includes a body member 1 and a discharge member 2. These members have screw thread engagement with each other, there being provided between their meeting end portions a packing 3 of any suitable material. A spider 4 is screw threaded in the member 2 and is provided at its center with a hub 5. A shaft 6 is slidably mounted in the hub 5 and is provided at one end with a non-circular head 7 and at its opposite end with a cone shaped head 8. A spring 9 surrounds the intermediate portion of the shaft 6 and is interposed between the hub 5 and the head 7. The said spring 9 is under tension with a tendency to hold the head 8 in contact with the adjacent side of the spider 4. When the head 8 is in contact with the adjacent side of the spider 4, the head 7 is held spaced from the interior walls of the member 1 as best shown in Fig. 1 of the drawing. The head 8 is provided at its side with a series of grooves 10 which extend the full length of the head. The discharge member 2 is provided with an outlet opening 11 and beyond the said opening the said member 2 is provided with an annular conical wall 12. At its smaller end the head 8 is less in diameter than the diameter of the opening 11, but the conical portions of the exterior surface of the head 8 may fit in close contact against the inner wall of the discharge member 2 in the vicinity of the outlet opening 11 thereof.

The operation of the device is as follows: When water is admitted into the member 1 at the receiving end thereof it comes in contact with the adjacent end of the head 7 and moves the said head and the shaft 6 toward the right and against the tension of the spring 9. The water then passes through the spider 4 and exerts a certain amount of pressure behind the head 8 and holds the forward portion of the head in close contact with the inner wall of the discharge member 2, whereby the ends of the grooves 10 at the smaller end of the head 8 are positioned within the circumference of the opening 11 as best shown in Fig. 2 of the drawing. The water then passes along the grooves 10 and out through the opening 11 in fine streams. These streams are directed in different directions and consequently when they come in contact with each other they assume the form of a spray, which is directed along the wall 12 and may mix with air, steam or other elements in a gaseous form. As soon as the supply of water is cut off from the body member 1 the tension of the spring 9 comes into play and the shaft 6 is moved longitudinally whereby the head 8 is moved away from the openings 11, and the said head assumes its normal position against the side of the spider 4. In view of the fact that the head 8 at intervals moves toward and away from the opening 11, the said opening is at all times kept free from the accumulation of solid matter, and the relatively fine streams of water may pass along the grooves 10 without interference and the nozzle is prevented from becoming clogged or choked up.

Having described the invention what is claimed is:—

A nozzle comprising a body member having an inlet opening, a discharge member detachably connected with the body member and provided with an outlet opening, a spider detachably mounted between said members, a shaft slidably mounted in the spider, a conical head secured upon one end of said shaft and provided with grooves, a head on the other end of said shaft having substantially the same diameter as said inlet opening, a spring disposed about the shaft and bearing against said last named head and the spider, whereby to hold said last named head adjacent said inlet opening in position to be impinged upon by water entering said opening, whereby admission of water through said opening will impinge against said last named head to move said shaft longitudinally against the resistance of said spring into engagement with the outlet end of said discharge member.

In testimony whereof I affix my signature in presence of two witnesses.

VICTOR E. MERTZ.

Witnesses:
J. A. DONEALLY,
M. E. LAUGHLIN.

Copies of this patent may be obtained for five cents each, by addressing the "Commissioner of Patents, Washington, D. C."